(12) United States Patent
Huang

(10) Patent No.: US 11,775,023 B2
(45) Date of Patent: Oct. 3, 2023

(54) VEHICLE DIAGNOSTIC TABLET COMPUTER AND HOUSING ASSEMBLY THEREOF

(71) Applicant: AUTEL INTELLIGENT TECHNOLOGY CORP., LTD., Guangdong (CN)

(72) Inventor: Chang Huang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 106 days.

(21) Appl. No.: 17/387,490

(22) Filed: Jul. 28, 2021

(65) Prior Publication Data
US 2021/0356989 A1 Nov. 18, 2021

Related U.S. Application Data

(63) Continuation of application No. PCT/CN2020/070461, filed on Jan. 6, 2020.

(30) Foreign Application Priority Data

Jan. 7, 2019 (CN) .......................... 201910012338.1

(51) Int. Cl.
*G06F 1/16* (2006.01)
*H04B 1/3877* (2015.01)

(52) U.S. Cl.
CPC ........... *G06F 1/166* (2013.01); *H04B 1/3877* (2013.01)

(58) Field of Classification Search
CPC ....... G06F 1/166; G06F 1/1626; F16M 11/10; F16M 13/005; H04B 1/3877
See application file for complete search history.

(56) References Cited

U.S. PATENT DOCUMENTS

| 6,807,712 | B2* | 10/2004 | Maatta ................... G06F 1/1681 |
| | | | 16/374 |
| 7,859,853 | B2* | 12/2010 | Schmeisser ........... G06F 1/1626 |
| | | | 361/752 |
| 8,403,288 | B2* | 3/2013 | Cheng .................... F16M 11/10 |
| | | | 248/673 |
| 8,879,250 | B2* | 11/2014 | Franz ...................... G06F 1/166 |
| | | | 455/575.8 |

FOREIGN PATENT DOCUMENTS

| CN | 204515596 U | 7/2015 |
| CN | 109521845 A | 3/2019 |

OTHER PUBLICATIONS

International Search Regort dated Apr. 10, 2020; PCT/CN2020/070461.

* cited by examiner

*Primary Examiner* — James Wu

(57) ABSTRACT

The present invention relates to the field of vehicle diagnostic tablet computers, and provides a vehicle diagnostic tablet computer and a housing assembly thereof. The housing assembly includes a housing and a support frame. The support frame is mounted to the housing, and the support frame is rotatable to a first position or a second position about a rotation axis relative to the housing. The support frame rotates to the first position about the rotation axis relative to the housing when the support frame is unfolded relative to the housing. The support frame is capable of supporting the housing. The support frame rotates to the second position about the rotation axis relative to the housing when the support frame is folded relative to the housing.

19 Claims, 7 Drawing Sheets

VEHICLE DIAGNOSTIC TABLET COMPUTER AND HOUSING ASSEMBLY THEREOF

CROSS REFERENCE OF RELATED APPLICATIONS

This application is a continuation application of International Application No. PCT/CN2020/070461, filed on Jan. 6, 2020, which claims priority of Chinese Patent Application No. 201910012338.1, filed on Jan. 7, 2019, which is incorporated herein by reference in its entirety.

TECHNICAL FILED

The present application relates to the field of vehicle diagnostic tablet computers, and in particular, to a vehicle diagnostic tablet computer and a housing assembly thereof.

BACKGROUND

As an automation degree of vehicles is increasingly high, more and more vehicles adopt a computer control system, and the structure of the vehicles is increasingly complex. This causes increasingly complex vehicle faults.

A vehicle diagnostic tablet computer is a tablet computer specially used with a vehicle diagnostic system, and generally needs to be used in a vehicle, for example, to calibrate parameters displayed in the vehicle diagnostic tablet computer with parameters of a vehicle dashboard.

The inventor found that, a current vehicle diagnostic tablet computer can only be handheld, which is inconvenient in use.

SUMMARY

To resolve the foregoing technical problem, embodiments of the present invention provide an easy-to-use vehicle diagnostic tablet computer and a housing assembly thereof.

To resolve the foregoing technical problem, the embodiments of the present invention provide the following technical solutions:

According to one aspect, a housing assembly is provided, and is applicable to a vehicle diagnostic tablet computer. The housing assembly includes a housing and a support frame. The support frame is mounted to the housing, and the support frame is rotatable to a first position or a second position about a rotation axis relative to the housing. The support frame rotates to the first position about the rotation axis relative to the housing when the support frame is unfolded relative to the housing. The support frame is capable of supporting the housing. The support frame, rotating to the second position about the rotation axis relative to the housing when the support frame is folded relative to the housing.

In some embodiments, the housing is provided with a receiving groove, and the support frame is mounted on a groove wall of the receiving groove. When the support frame rotates to the second position about the rotation axis relative to the housing, the support frame is received in the receiving groove.

In some embodiments, the support frame includes a first connecting arm, a second connecting arm and a support arm, the first connecting arm being opposite to the second connecting arm, and the support arm being connected between the first connecting arm and the second connecting arm. The receiving groove has the groove wall, the groove wall including a first mounting surface and a second mounting surface, and the first mounting surface facing or facing away from the second mounting surface. An end of the first connecting arm away from the support arm is rotatably connected to the first mounting surface, and an end of the second connecting arm away from the support arm is rotatably connected to the second mounting surface, so that the support frame is rotatable about the rotation axis relative to the housing.

In some embodiments, the support frame further includes a first rotating shaft and a second rotating shaft, the first rotating shaft being connected to the end of the first connecting arm away from the support arm, the second rotating shaft being connected to the end of the second connecting arm away from the support arm, and a center line of the first rotating shaft and a center line of the second rotating shaft both overlapping the rotation axis. The first rotating shaft is inserted into a first shaft hole from a side facing the first mounting surface, and the second rotating shaft is inserted into a second shaft hole from a side facing the second mounting surface.

In some embodiments, the first mounting surface is provided with a first limiting portion. The groove wall further includes a first stopping surface, the first stopping surface extending on the first mounting surface, and both the first stopping surface and the first limiting portion being located at the side facing the first mounting surface. When the support frame rotates to the first position about the rotation axis relative to the housing, the first connecting arm abuts between the first stopping surface and the first limiting portion.

In some embodiments, the first limiting portion includes a first limiting surface, the first limiting surface facing the first stopping surface. When the support frame rotates to the first position about the rotation axis relative to the housing, the first connecting arm is in close contact with the first limiting surface.

In some embodiments, the receiving groove has a groove bottom, the groove bottom being connected between the first mounting surface and the second mounting surface, and the first stopping surface being connected to the groove bottom. When the support frame rotates to the second position about the rotation axis relative to the housing, the first connecting arm abuts between the groove bottom and the first limiting portion.

In some embodiments, the first limiting portion includes a second limiting surface, the second limiting surface facing the groove bottom. When the support frame rotates to the second position about the rotation axis relative to the housing, the first connecting arm is in close contact with the second limiting surface.

In some embodiments, the support frame is made of an elastic material. When the support frame rotates between the first position and the second position about the rotation axis relative to the housing, the support frame is elastically deformable to cause the first connecting arm to cross the first limiting portion.

In some embodiments, a joint between the first rotating shaft and the first connecting arm is elastically bendable, so that an angle between the first rotating shaft and the first connecting arm changes. A joint between the first connecting arm and the support arm is elastically bendable, so that an angle between the first connecting arm and the support arm changes. When the first connecting arm crosses the first limiting portion, the angle between the first rotating shaft and the first connecting arm changes, and the angle between the first connecting arm and the support arm changes, so that an end of the first connecting arm close to the first rotating shaft is offset toward a direction away from the first mounting surface.

In some embodiments, the first limiting portion includes a first top surface and a first side surface. The first top surface faces away from the groove bottom, the first side surface is adjacent to the first top surface, and a joint between the first top surface and the first side surface is in arc-shaped transition.

In some embodiments, the groove wall further includes a first retaining surface. The first mounting surface faces the first retaining surface, the first shaft hole faces the first retaining surface, and the first stopping surface is connected between the first mounting surface and the first retaining surface. A distance from the first retaining surface to the first mounting surface is less than a length of the first rotating shaft inserted into the first shaft hole.

In some embodiments, the first mounting surface is provided with a first sliding groove, one end of the first sliding groove faces the first retaining surface, the other end of the first sliding groove does not face the first retaining surface, and a bottom of the first sliding groove is provided with the first shaft hole. The first sliding groove is configured to guide the first rotating shaft to be inserted into the first shaft hole.

In some embodiments, the housing has an outer wall and an inner wall facing away from each other. The receiving groove is disposed on the outer wall. The bottom of the first sliding groove is provided with a first semicircular groove and the mounting groove, the mounting groove extending to the inner wall, the first semicircular groove being in communication with the mounting groove, and a center line of the first semicircular groove overlapping the rotation axis. The housing assembly further includes a pressing plate, the pressing plate being provided with a second semicircular groove, and a center line of the second semicircular groove overlapping the rotation axis. The pressing plate is mounted in the mounting groove from a side facing the inner wall, and the first semicircular groove and the second semicircular groove enclose the first shaft hole.

In some embodiments, the pressing plate is connected to the housing by using a screw.

In some embodiments, the groove wall further includes a connecting surface, the connecting surface being connected between the two mounting surfaces. The shaft hole is away from the connecting surface, the connecting surface being provided with a third limiting portion. When the support frame is located at the second position relative to the housing, the support arm abuts on a side of the third limiting portion facing away from the connecting surface.

In some embodiments, the third limiting portion includes a third limiting surface, the third limiting surface facing away from the connecting surface. When the support frame is located at the second position relative to the housing, the support arm is in close contact with the third limiting surface.

In some embodiments, the support arm is made of an elastic material. When the support frame rotates between the first position and the second position relative to the housing, the support arm is bendable to cause the support arm to cross the third limiting portion.

In some embodiments, the third limiting portion includes a second top surface and a second side surface. The second top surface faces away from a groove bottom of the receiving groove, and the second side surface is adjacent to the second top surface. A joint between the second top surface and the second side surface is in arc-shaped transition.

In some embodiments, the housing assembly further includes a battery cover. The battery cover is mounted in the receiving groove, and the battery cover and the receiving groove enclose a U-shaped groove. When the support frame rotates to the second position about the rotation axis relative to the housing, the support frame is received in the U-shaped groove.

According to another aspect, a vehicle diagnostic tablet computer is provided, including the housing assembly described above.

Compared with the prior art, in the vehicle diagnostic tablet computer and the housing assembly thereof in the embodiments of the present invention, the housing assembly includes: a housing; and a support frame, mounted to the housing, the support frame being rotatable to a first position or a second position about a rotation axis relative to the housing; the support frame, when unfolded relative to the housing, rotating to the first position about the rotation axis relative to the housing, and the support frame being capable of supporting the housing; and the support frame, when folded relative to the housing, rotating to the second position about the rotation axis relative to the housing. Provided with the support frame that is foldable or unfoldable relative to the housing, the vehicle diagnostic tablet computer may be handheld, or may be placed on a vehicle, which is convenient in use.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of the present invention, the present invention is described below in more detail with reference to accompanying drawings and specific implementations. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, meanings of all technical and scientific terms used in this specification are the same as those generally understood by a person skilled in the technical field to which the present invention belongs. Terms used in the specification of the present invention are merely intended to describe objectives of the specific implementations, and are not intended to limit the present invention. A term "and/or" used in this specification includes any or all combinations of one or more related listed items.

Figure 1:
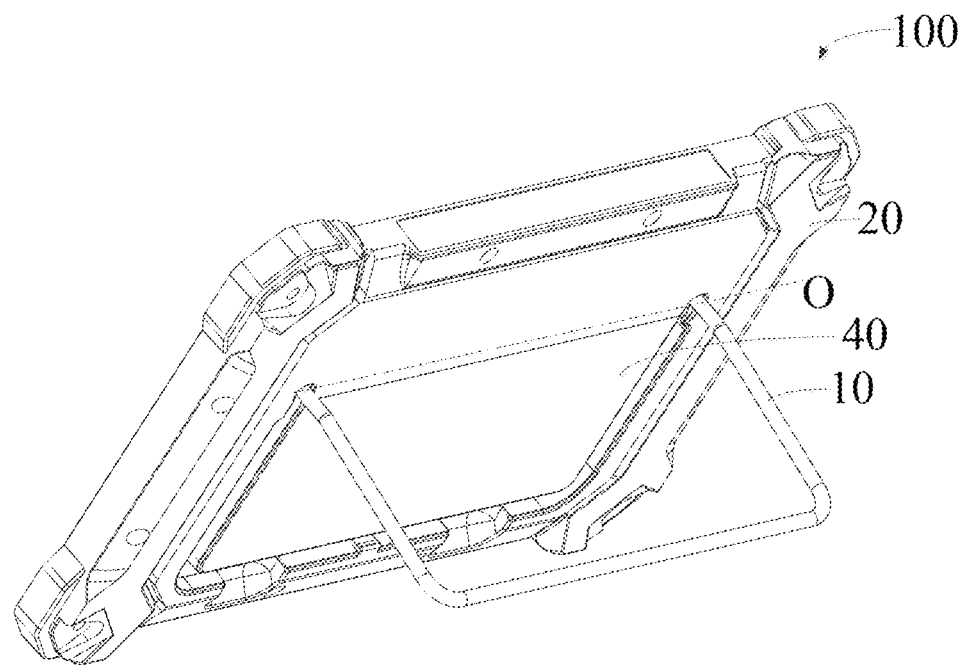
FIG. 1 is a three-dimensional diagram of a housing assembly according to an embodiment of the present invention, where a support frame of the housing assembly is unfolded.
Figure 2:
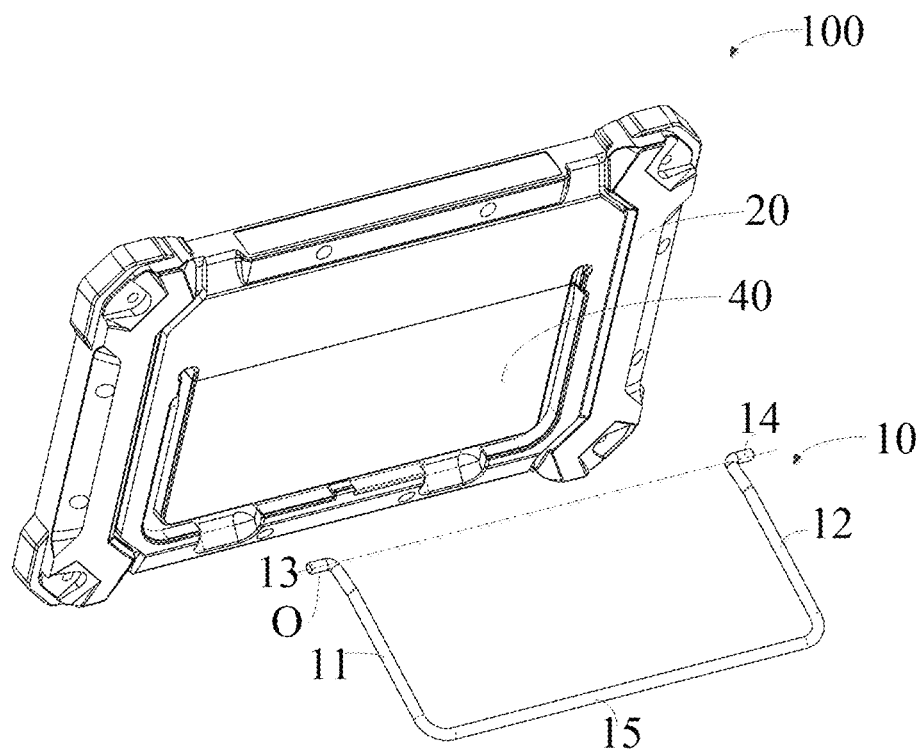
FIG. 2 is an exploded view of the housing assembly shown in FIG. 1.

Referring to FIG. 1 and FIG. 2, embodiments of the present invention provide a vehicle diagnostic tablet computer. The vehicle diagnostic tablet computer includes a housing assembly 100 and a control circuit assembly mounted in the housing assembly 100.

The control circuit assembly includes a plurality of control modules, for example, a display adapter configured to control a display of the vehicle diagnostic tablet computer, a central processing unit configured to control a processing program of the vehicle diagnostic tablet computer, and a sound processing chip configured to control an audio device of the vehicle diagnostic tablet computer. For ease of description of the embodiments of the present invention, only components related to the embodiments of the present invention are shown in the accompanying drawings.

The housing assembly 100 includes a housing 20 and a support frame 10 mounted to the housing 20. The support frame 10 is configured to support the housing 20.

In this embodiment, the support frame 10, the housing 20 and a support surface may form a triangle, so that the support frame 10 supports the housing 20 on the support surface. The support surface is, for example, a ground surface or a desk surface. In some other embodiments, the support frame 10 may independently support the housing 20 on the support surface. Therefore, in this embodiment of the present invention, a marmer in which the support frame 10 supports the housing 20 is merely an example.

Figure 3:
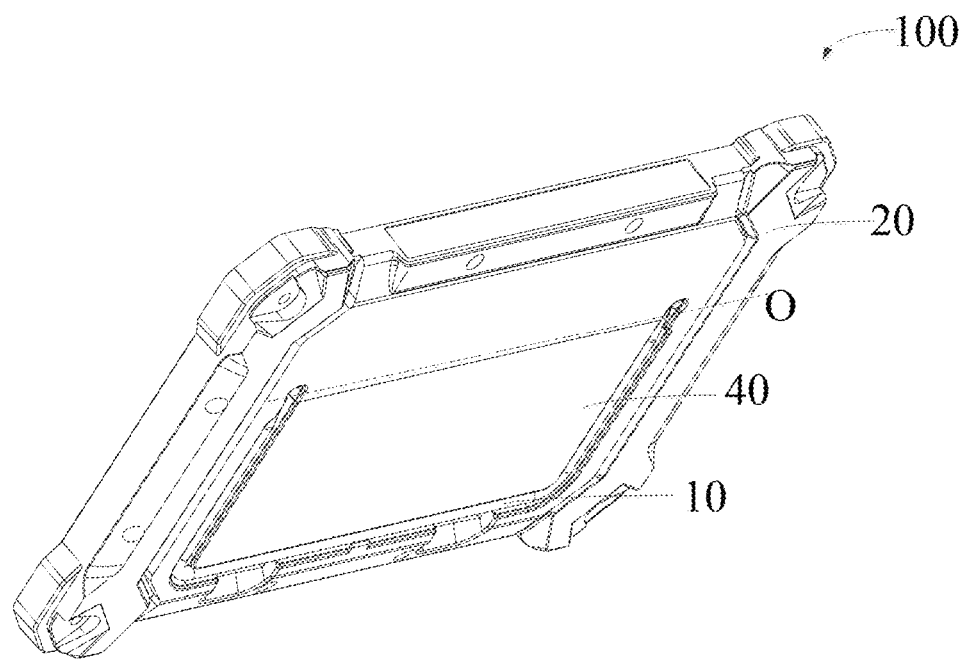
FIG. 3 is a three-dimensional diagram of the housing assembly shown in FIG. 1 in another state, where the support frame is folded.

Referring to FIG. 3 together, the support frame 10 is rotatable to a first position or a second position about a rotation axis O relative to the housing 20.

The support frame 10, when unfolded relative to the housing 20, rotates to the first position about the rotation axis O relative to the housing 20. The support frame 10, when folded relative to the housing 20, rotates to the second position about the rotation axis O relative to the housing 20.

It is to be noted that, by unfolding or folding the support frame 10 relative to the housing 20, the vehicle diagnostic tablet computer may be handheld, or may be placed on the support surface by using the support frame 10, so that it is convenient to use the vehicle diagnostic tablet computer.

The support frame 10 is U-shaped as a whole, and may be made of an elastic material, for example, made by using a process of bending a stainless steel bar with a cross section of 5 mm.

The support frame 10 has two ends and a middle portion between the two ends of the support frame 10 is bent, so that the two ends of the support frame 10 face each other. The two ends of the support frame 10 are separately connected to the housing 20, and the two ends of the support frame 10 may simultaneously rotate relative to the housing 20.

It is to be noted that, by connecting the two ends of the support frame 10 and the housing 20, when the support frame 10 is unfolded relative to the housing 20, the support frame 10 and the housing 20 constitute an armular structure. Therefore, the vehicle diagnostic tablet computer may be suspended by using the support frame 10. For example, the vehicle diagnostic tablet computer is suspended on a vehicle dashboard by using the support frame 10, so that it is more convenient to use the vehicle diagnostic tablet computer.

The support frame 10 includes a first connecting arm 11, a second connecting arm 12, a first rotating shaft 13, a second rotating shaft 14 and a support arm 15. The first connecting arm 11 is opposite to the second connecting arm 12, and the support arm 15 is connected between the first connecting arm 11 and the second connecting arm 12. The first rotating shaft 13 is connected to an end of the first connecting arm 11 away from the support arm 15, and the second rotating shaft 14 is connected to an end of the second connecting arm 12 away from the support arm 15. A center line of the first rotating shaft 13 and a center line of the second rotating shaft 14 both overlap the rotation axis O, and both the first rotating shaft 13 and the second rotating shaft 14 are located between the first connecting arm 11 and the second connecting arm 12.

A joint between the first rotating shaft 13 and the first connecting arm 11 is elastically bendable, so that an angle between the first rotating shaft 13 and the first connecting arm 11 changes. A joint between the first connecting arm 11 and the support arm 15 is elastically bendable, so that an angle between the first connecting arm 11 and the support arm 15 becomes larger or smaller.

When the support frame 10 is in a natural state, the angle between the first rotating shaft 13 and the first connecting arm 11 is a right angle, and the angle between the first connecting arm 11 and the support arm 15 is a right angle. It may be understood that, on the one hand, according to an actual situation, the angle between the first rotating shaft 13 and the first connecting arm 11 may be alternatively an acute angle, provided that the angle between the first rotating shaft 13 and the first connecting arm 11 does not exceed 90 degrees. On the other hand, according to an actual situation, the angle between the first connecting arm 13 and the support arm 15 may be alternatively an acute angle, provided that the angle between the first connecting arm 11 and the support arm 15 does not exceed 90 degrees.

The support frame 10 is of a symmetrical structure, the second rotating shaft 14 is symmetrical to the first rotating shaft 13, and the second connecting arm 12 is symmetrical to the first connecting arm 11. Details are not described herein again.

When the angle between the first rotating shaft 13 and the first connecting arm 11 becomes smaller, and the angle between the first connecting arm 11 and the support arm 15 becomes smaller, the first rotating shaft 13 and the second rotating shaft 14 approach each other. When the angle between the first rotating shaft 13 and the first connecting arm 11 becomes larger, and the angle between the first connecting arm 11 and the support arm 15 becomes larger, the first rotating shaft 13 and the second rotating shaft 14 move away from each other.

It should be noted that, in the process of the first rotating shaft 13 and the second rotating shaft 14 approaching each other, the first rotating shaft 13 and the second rotating shaft 14 are kept on the rotation axis O. Therefore, the support frame 10 is still rotatable about the rotation axis O relative to the housing 20.

Figure 4:
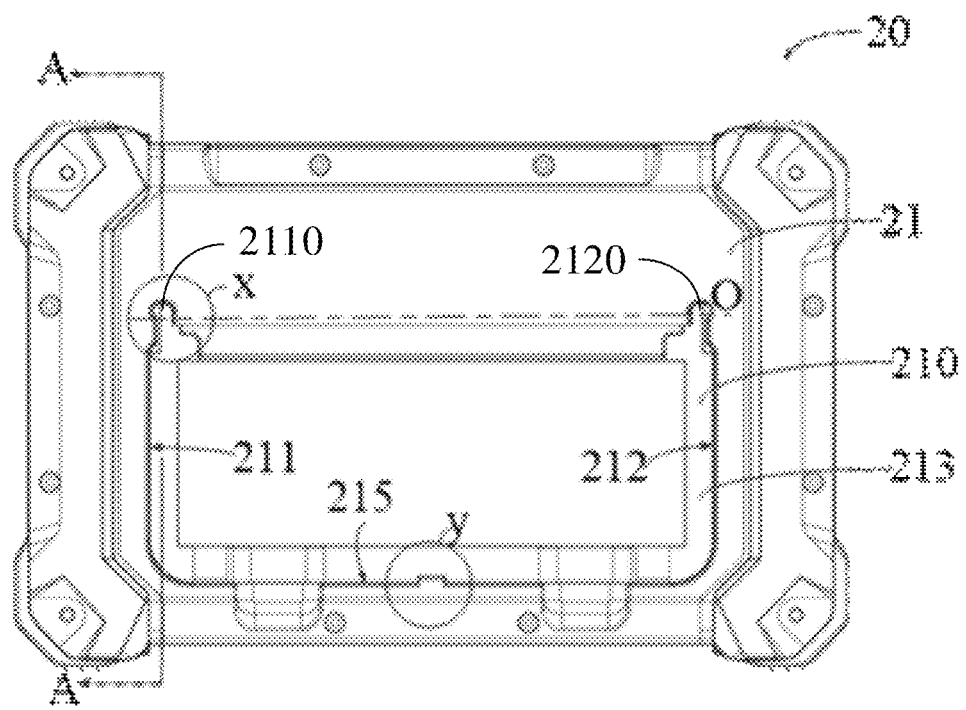
FIG. 4 is a front view of a housing of the housing assembly shown in FIG. 1.
Figure 5:
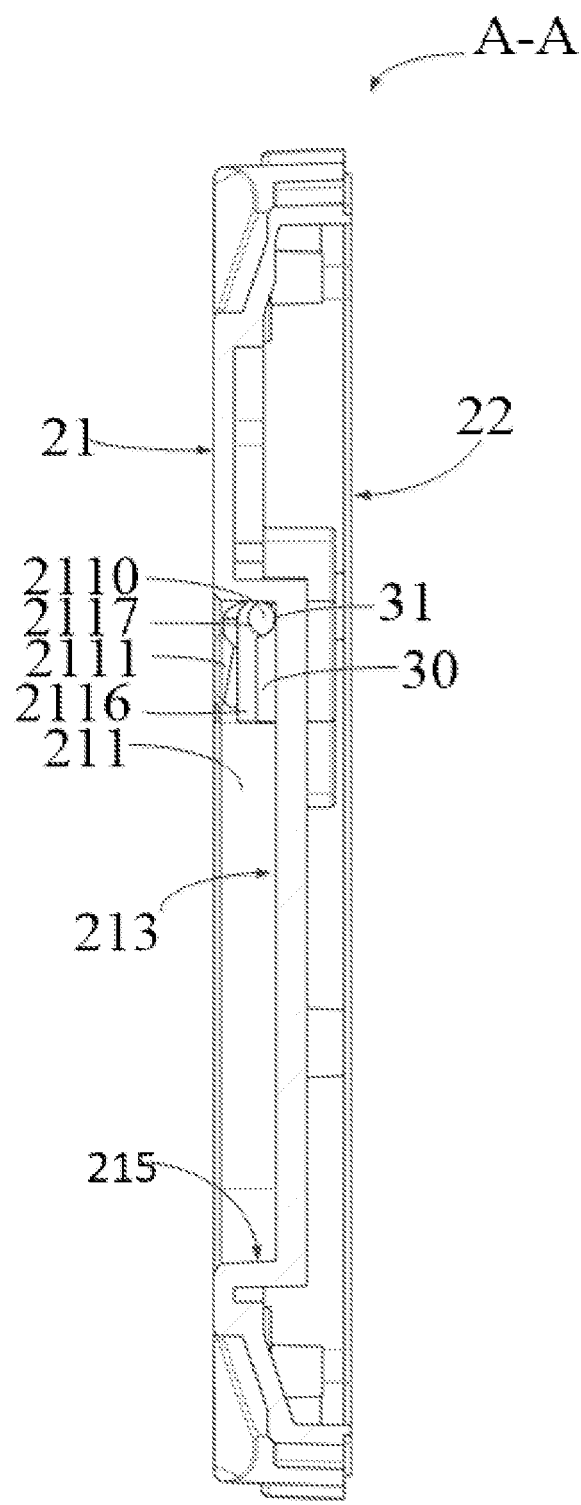
FIG. 5 is a cross-sectional view along A-A of the housing shown in FIG. 4.

Referring to FIG. 4 and FIG. 5 together, the housing 20 includes an outer wall 21 and an inner wall 22, the outer wall 21 and the inner wall 22 facing away from each other.

The outer wall 21 is provided with a receiving groove 210, and the two ends of the support frame 10 are mounted in the receiving groove 210. When the support frame 10 is folded about the rotation axis O relative to the housing 20, the support frame 10 is received in the receiving groove 210. The receiving groove 210 is provided, so that the support frame 10 is not prone to collide after being folded, thereby preventing the support frame 10 from being damaged due to collision.

The receiving groove 210 has a groove wall. The groove wall includes a first mounting surface 211 and a second mounting surface 212.

The first mounting surface 211 faces the second mounting surface 212. The first mounting surface 211 is provided with a first shaft hole 2110 disposed along the rotation axis O, and the first rotating shaft 13 is inserted into the first shaft hole 2110. On the one hand, the first rotating shaft 13 is rotatable about the rotation axis O relative to the housing 20, that is, the support frame 10 is rotatable about the rotation axis O relative to the housing 20. On the other hand, the first rotating shaft 13 is movable along the rotation axis O relative to the housing 20, so that the first rotating shaft 13 and the second rotating shaft 14 may approach each other or move away from each other along the rotation axis O.

Similarly, the second mounting surface 212 is provided with a second shaft hole 2120 provided along the rotation axis O, and the second rotating shaft 14 is inserted into the second shaft hole 2120. On the one hand, the second rotating shaft 14 is rotatable about the rotation axis O relative to the housing 20. On the other hand, the second rotating shaft 14 is movable along the rotation axis O relative to the housing 20, so that the first rotating shaft 13 and the second rotating shaft 14 may approach each other or move away from each other along the rotation axis O.

It may be understood that, according to an actual situation, the first mounting surface 211 and the second mounting surface 212 are not limited to facing each other. In some other embodiments, the first mounting surface 211 and the second mounting surface 212 face away from each other, and the first connecting arm 11 and the second connecting arm 12 are located between the first rotating shaft 13 and the second rotating shaft 14. Therefore, the first mounting surface 211 and the second mounting surface 212 can either face away from or face each other.

The first mounting surface 211 is provided with a first limiting portion 2111. The first limiting portion 2111 is configured to abut against the first connecting arm 11, so that the support frame 10 remains at the first position or the second position relative to the housing 20.

The receiving groove 210 further has a groove bottom 213, the groove bottom 213 being connected between the first mounting surface 211 and the second mounting surface 212. When the support frame 10 rotates to the first position about the rotation axis O relative to the housing 20, the first connecting arm abuts between the first limiting portion 2111 and the groove bottom 213.

The second mounting surface 212 is provided with a second limiting portion, a position of the second limiting portion is symmetrical to a position of the first limiting portion, and a principle of the second limiting portion is the same as that of the first limiting portion 2111. Details are not described herein again.

Figure 6:
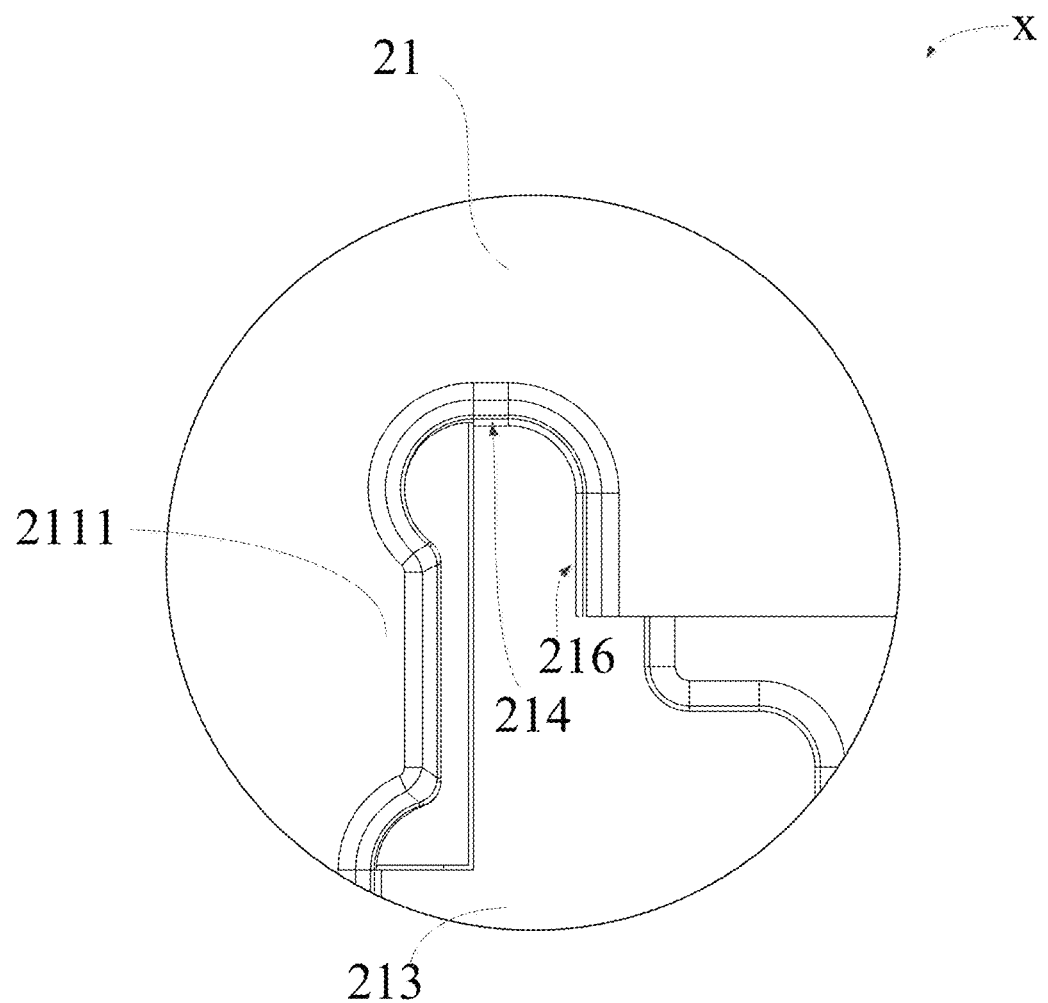
FIG. 6 is an enlarged view at x of the housing shown in FIG. 4.
Figure 7:
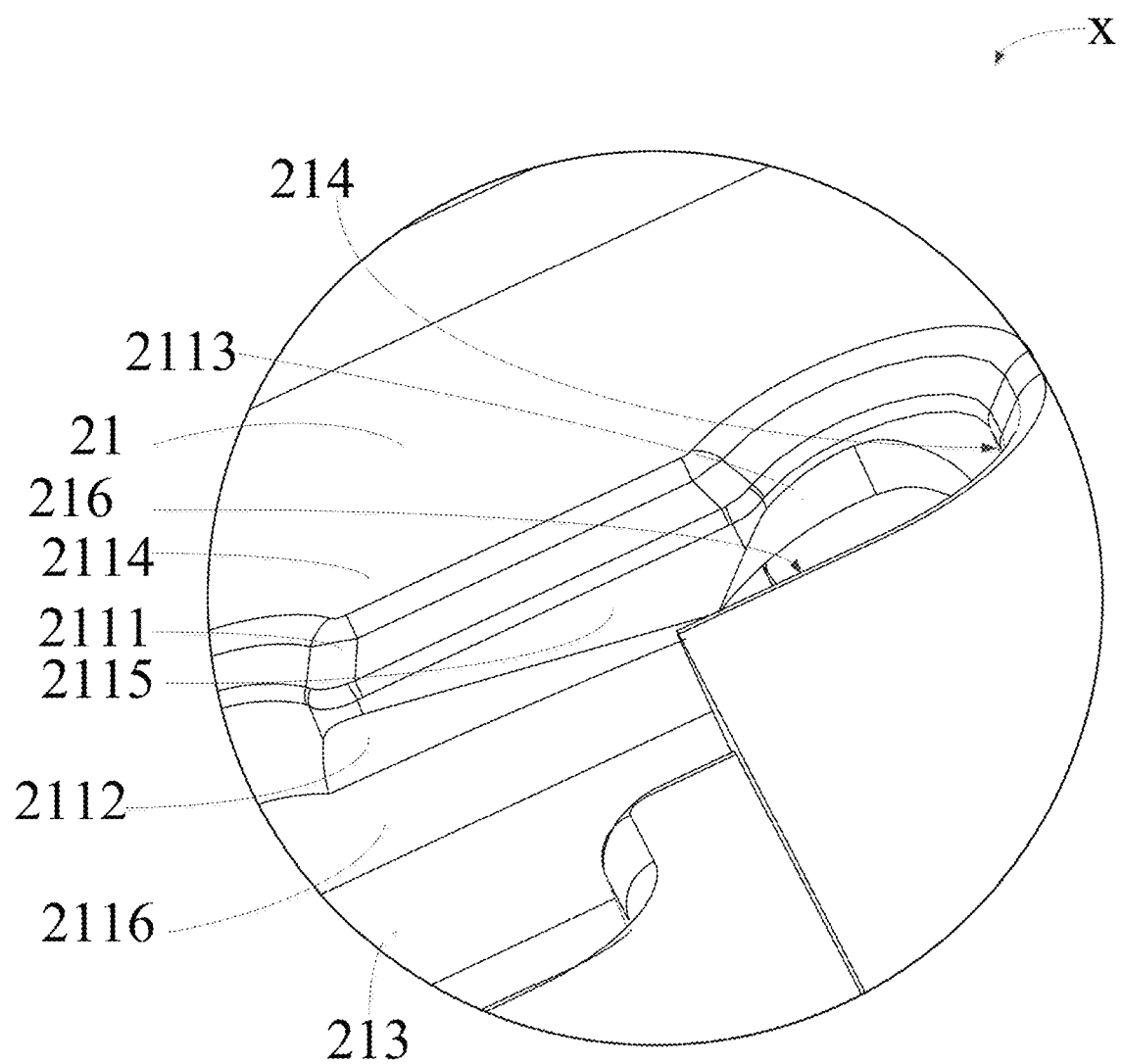
FIG. 7 is an enlarged view at x of the housing shown in FIG. 6 from another perspective.

Referring to FIG. 6 and FIG. 7 together, the groove wall further includes a first stopping surface 214 and a second stopping surface. The first stopping surface 214 is connected to the first mounting surface 211, and the first stopping surface 214 is located between the first mounting surface and 211 and the second mounting surface 212. In addition, the first stopping surface 214 is connected to the groove bottom 213, and every two of the first stopping surface 214, the groove bottom 213 and the first mounting surface 211 are perpendicular to each other. When the support frame 10 rotates to the second position about the rotation axis O relative to the housing 20, the first connecting arm 11 abuts between the first limiting portion 2111 and the first stopping surface 214.

A position of the second stopping surface is symmetrical to a position of the first stopping surface 214, and a principle of the second stopping surface is the same as that of the first stopping surface 214. Details are not described herein again.

It may be understood that, on the one hand, according to an actual situation, the second limiting portion may be omitted, provided that the first limiting portion 2111 can also limit the support frame 10. On the other hand, the second stopping surface may be omitted, provided that the first stopping surface 214 may still limit the support frame 10.

When the support frame 10 rotates between the first position and the second position about the rotation axis O relative to the housing 20, the first rotating shaft 13 and the second rotating shaft 14 approach each other along the rotation axis O, and an end of the first connecting arm 11 close to the first rotating shaft 13 is offset toward a direction away from the first mounting surface 211, so that the first connecting arm 11 may cross the first limiting portion 2111. In addition, the support frame 10 rotates about the rotation axis O relative to the housing 20, so that the support frame 10 rotates between the first position and the second position about the rotation axis O relative to the housing 20.

The first limiting portion 2111 is substantially block-shaped, and the first limiting portion 2111 includes a first limiting surface 2112 and a second limiting surface 2113. The first limiting surface 2112 is an inner circular arc surface, and the first limiting surface 2112 faces the groove bottom 213. When the support frame 10 rotates to the first position about the rotation axis O relative to the housing 20, the first connecting arm 11 abuts between the first limiting surface 2112 and the groove bottom 213, and the first limiting surface 2112 is in close contact with the first connecting arm 11. The first limiting surface 2112 is configured as the inner circular arc surface, so that the support frame 10 may be less prone to shake relative to the housing 20 after being unfolded.

Similarly, the second limiting surface 2113 is an inner circular arc surface, and the second limiting surface 2113 faces the first stopping surface 214. When the support frame 10 rotates to the second position about the rotation axis O relative to the housing 20, the first connecting arm 11 abuts between the second limiting surface 2113 and the first stopping surface 214, and the second limiting surface 2113 is in close contact with the first connecting arm 11. The second limiting surface 2113 is configured as the inner circular arc surface, so that the support frame 10 may be less prone to shake relative to the housing 20 after being folded.

The first limiting portion 2111 further includes a first top surface 2114 and a first side surface 2115. The first top surface 2114 faces away from the groove bottom 213, the first side surface 2115 is adjacent to the first top surface 2114, and a joint between the first top surface 2114 and the first side surface 2115 is in arc-shaped transition. When the support frame 10 rotates between the first position and the second position about the rotation axis O relative to the housing 20, an angle between the first connecting arm 11 and the first rotating shaft 13 becomes smaller, and the first connecting arm 11 is in close contact with the joint between the first side surface 2115 and the first top surface 2114 and crosses the first limiting portion 2111. Because the joint between the first top surface 2114 and the first side surface 2115 is in arc-shaped transition, the first limiting portion 2111 and the first connecting arm 11 are less prone to relative damage, and the first connecting arm 11 crosses the first limiting portion 2111 more easily.

The groove wall further includes a connecting surface 215. The connecting surface 215 is connected between the first mounting surface 211 and the second mounting surface 212. The connecting surface 215 is connected to the groove bottom 213. Every two of the connecting surface 215, the first mounting surface 211 and the groove bottom 213 are perpendicular to each other, and the connecting surface 215 faces the first stopping surface 214. In the first stopping surface 214 and the connecting surface 215, the first shaft hole 2110 is closer to the first stopping surface 214, so that when the support frame 10 is at the second position, the support arm 15 is close to the connecting surface 215.

Figure 8:
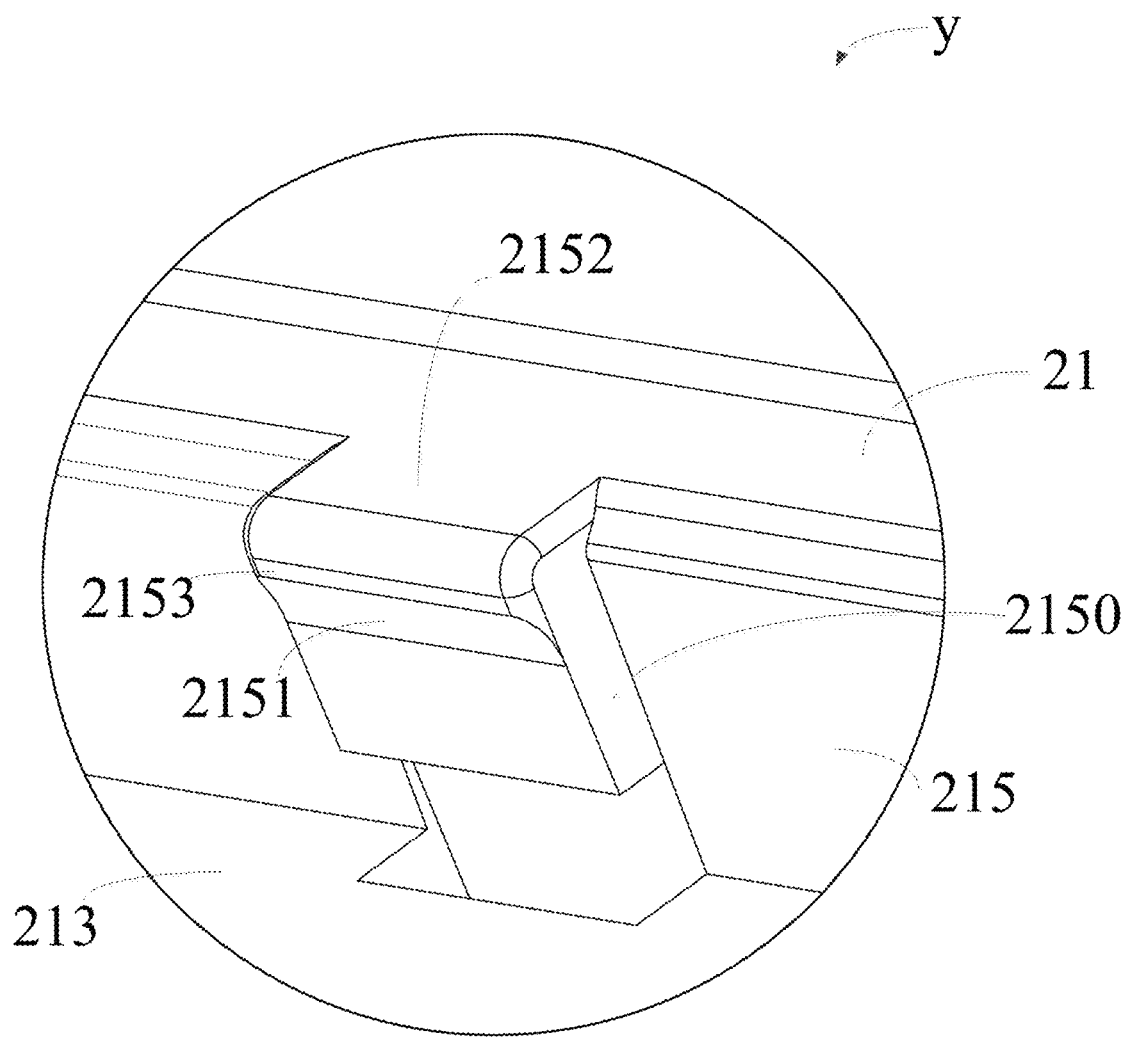
FIG. 8 is an enlarged view at y of the housing shown in FIG. 4.

Referring to FIG. 8 together, the connecting surface 215 is provided with a third limiting portion 2150. When the support frame 10 is at the second position, the support arm 15 abuts against the third limiting portion 2150, so that the support frame 10 at the second position is less prone to be disengaged from the receiving groove 210.

When the support frame 10 rotates between the first position and the second position about the rotation axis O relative to the housing 20, the support arm 15 is elastically bendable slightly to cause the support arm 15 to cross the third limiting portion 2150, so that the support frame 10 rotates between the first position and the second position about the rotation axis O relative to the housing 20.

The third limiting portion 2150 is block-shaped as a whole and includes a third limiting surface 2151. The third limiting surface 2151 is an inner circular arc surface, and the third limiting surface 2151 faces away from the connecting surface 215. When the support frame 10 is at the second position, the third limiting surface 2151 abuts against the support arm 15, and the third limiting surface 2151 is in close contact with the support arm 15, so that the support frame 10 is less prone to be disengaged from the receiving groove 210.

The third limiting portion 2150 further includes a second top surface 2152 and a second side surface 2153. The second top surface 2152 faces away from the groove bottom 213, the second side surface 2153 is adjacent to the second top surface 2152, and a joint between the second side surface 2153 and the second top surface 215 is in arc-shaped transition. When the support frame 10 is switched from the first position to the second position about the rotational axis O relative to the housing 20, the support arm 15 moves in close contact with the joint between the second top surface 2152 and the second side surface 2153. Because the joint between the second top surface 2152 and the second side surface 2153 is in arc-shaped transition, the third limiting portion 2150 and the support arm 15 are less prone to relative wear, and the support arm 15 crosses the third limiting portion 2150 more easily.

The groove wall further includes a first retaining surface 216 and a second retaining surface. The first retaining surface 216 faces the first mounting surface 211, and the first stopping surface 214 is connected between the first retaining surface 216 and the first mounting surface 211. A distance from the first retaining surface 216 to the first mounting surface 211 is less than a length of the first rotating shaft 13 inserted into the first shaft hole 2110, so that the first rotating shaft 13 is not disengaged from the first shaft hole 2110.

A position of the second retaining surface is symmetrical to a position of the first retaining surface 216, and a principle of the second retaining surface is the same as that of the first retaining surface 216. Details are not described herein again.

The first mounting surface 211 is provided with a first sliding groove 2116. One end of the first sliding groove 2116 faces the first retaining surface 216, and the other end of the first sliding groove 2116 does not face the first retaining surface 216. A bottom of the first sliding groove 2116 is provided with the first shaft hole 2110, and the first sliding groove 2116 is configured to guide the first rotating shaft 13 to be inserted into the first shaft hole 2110. The first sliding groove 2116 is provided, and when the support frame 10 is assembled with the housing 20, the support frame 10 is bent, so that the first rotating shaft 13 and the second rotating shaft 14 approach each other. The first rotating shaft 13 may enter the first sliding groove 2116 from an end of the first sliding groove 2116 that does not face the first retaining surface 216, and moves along the first sliding groove 2116. The first shaft hole 2110 is counter-rotated at the first rotating shaft 13, to restore the support frame 10, and the first rotating shaft 13 is inserted into the first shaft hole 2110. In the process of assembling the support frame 10 with the housing 20, the first sliding groove 2116 is provided, which can facilitate the insertion of the first rotating shaft 13 into the first shaft hole 2110.

The second mounting surface 212 is provided with a second sliding groove, a position of the second sliding groove is symmetrical to that of the first sliding groove 2116, and a principle of the second sliding groove is the same as that of the first sliding groove 2116. Details are not described herein again.

Figure 9:
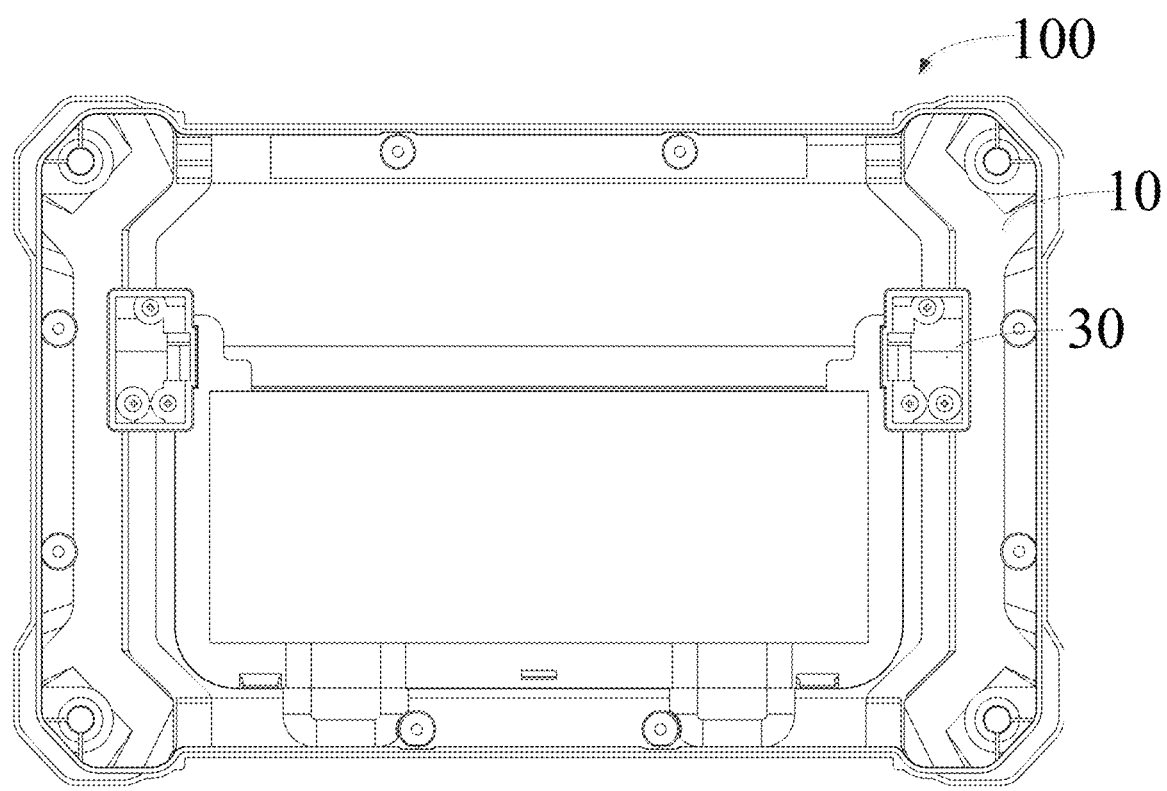
FIG. 9 is a rear view of the housing assembly shown in FIG. 1.

Referring to FIG. 9 together, the bottom of the first sliding groove 2116 is provided with a first semicircular groove 2117 and a mounting groove (not shown). The first semicircular groove 2117 is in communication with the mounting groove, a center line of the first semicircular groove 2117 overlaps the rotation axis O, the mounting groove extends to the inner wall 22, and the housing assembly 100 further includes a pressing plate 30.

The pressing plate 30 is provided with a second semicircular groove 31, and a center line of the second semicircular groove 31 overlaps the rotation axis O. The pressing plate 30 is mounted in the mounting groove from a side facing the inner wall 22. The first semicircular groove 2117 and the second semicircular groove 31 enclose the first shaft hole 2110. The pressing plate 30 is connected to the housing 20 by using a screw. For example, the pressing plate 30 is mounted to the housing 20 by using three screws. When the support frame 10 is assembled with the housing 20, the pressing plate 30 is provided, the first rotating shaft 13 may be first placed in the first semicircular groove 2117, and the pressing plate 30 is then mounted. The second semicircular groove 31 and the first semicircular groove 2117 enclose the first shaft hole 2110, which can facilitate the insertion of the first rotating shaft 13 into the first shaft hole 2110, and the mounting of the first rotating shaft 13 and the first shaft hole 2110 is relatively stable.

The receiving groove 210 is a battery compartment, and the housing assembly further includes a battery cover 40. The battery cover 40 is mounted in the receiving groove 210, so that the receiving groove 210 and the battery cover 40 enclose a U-shaped groove. When the support frame 10 is located at the first position about the rotation axis O relative to the housing 20, the support frame 10 is received in the U-shaped groove.

Compared with the prior art, the vehicle diagnostic tablet computer and the housing assembly 100 thereof provided in the embodiments of the present invention are provided with the support frame 10 that is foldable or unfoldable relative to the housing 20, so that the vehicle diagnostic tablet computer may be handheld, or may be placed on a vehicle, which is convenient in use.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A housing assembly, comprising:
   a housing; and
   a support frame, mounted to the housing,
   the support frame being rotatable to a first position or a second position about a rotation axis relative to the housing;
   the support frame, when unfolded relative to the housing, rotating to the first position about the rotation axis relative to the housing, and the support frame being capable of supporting the housing; and
   the support frame, when folded relative to the housing, rotating to the second position about the rotation axis relative to the housing, wherein the housing is provided with a receiving groove, and the support frame is mounted on a groove wall of the receiving groove;
   wherein the groove wall further comprises a first retaining surface, a first mounting surface, a first rotating shaft and a first stopping surface,
   wherein the first rotating shaft is inserted into a first shaft hole from a side facing the first mounting surface;
   wherein the first stopping surface race extends on the first mounting surface;
   wherein the first mounting surface faces the first retaining surface, the first shaft hole face the first retaining surface, and the first stopping surface is connected between the first mouting surface and the first retaining surface; and
   a shortest distance from the first retaining surface to the first mounting surface is less than a length of the first rotating shaft inserted into the first shaft hole.

2. The housing assembly according to claim 1,
   when the support frame rotates to the second position about the rotation axis relative to the housing, the support frame is received in the receiving groove.

3. The housing assembly according to claim 2, wherein the support frame comprises a first connecting arm, a second connecting arm and a support arm, the first connecting arm being opposite to the second connecting arm, and the support arm being connected between the first connecting arm and the second connecting arm;
   wherein the groove wall further comprises and a second mounting surface, and the first mounting surface faces or faces away from the second mounting surface; and
   an end of the first connecting arm away from the support arm is rotatably connected to the first mounting surface, and an end of the second connecting arm away from the support arm is rotatably connected to the second mounting surface, so that the support frame is rotatable about the rotation axis relative to the housing.

4. The housing assembly according to claim 3, wherein the support frame further comprises a second rotating shaft, the second rotating shaft being connected to the end of the second connecting arm away from the support arm, and a center line of the first rotating shaft and a center line of the second rotating shaft both overlapping the rotation axis; and
   the second rotating shaft is inserted into a second shaft hole from a side facing the second mounting surface.

5. The housing assembly according to claim 4, wherein the first mounting surface is provided with a first limiting portion;
   both the first stopping surface and the first limiting portion being located at the side facing the first mounting surface; and
   when the support frame rotates to the first position about the rotation axis relative to the housing, the first connecting arm abuts between the first stopping surface and the first limiting portion.

6. The housing assembly according to claim 5, wherein the first limiting portion comprises a first limiting surface; and
   when the support frame rotates to the first position about the rotation axis relative to the housing, the first connecting arm is in close contact with the first limiting surface.

7. The housing assembly according to claim 5, wherein the receiving groove has a groove bottom, the groove bottom being connected between the first mounting surface and the second mounting surface, and the first stopping surface being connected to the groove bottom; and
   when the support frame rotates to the second position about the rotation axis relative to the housing, the first connecting arm abuts between the groove bottom and the first limiting portion.

8. The housing assembly according to claim 7, wherein the first limiting portion comprises a second limiting surface; and
   when the support frame rotates to the second position about the rotation axis relative to the housing, the first connecting arm is in close contact with the second limiting surface.

9. The housing assembly according to claim 5, wherein the support frame is made of an elastic material; and
   when the support frame rotates between the first position and the second position about the rotation axis relative to the housing, the support frame is elastically deformable to cause the first connecting arm to cross the first limiting portion.

10. The housing assembly according to claim 9, wherein a joint between the first rotating shaft and the first connecting arm is elastically bendable, so that an angle between the first rotating shaft and the first connecting arm changes;

a joint between the first connecting arm and the support arm is elastically bendable, so that an angle between the first connecting arm and the support arm changes; and when the first connecting arm crosses the first limiting portion, the angle between the first rotating shaft and the first connecting arm changes, and the angle between the first connecting arm and the support arm changes, so that the end of the first connecting arm close to the first rotating shaft is offset toward a direction away from the first mounting surface.

11. The housing assembly according to claim 9, wherein the first limiting portion comprises a first top surface and a first side surface; and the first top surface faces away from the groove bottom, and a joint between the first top surface and the first side surface is in arc-shaped transition.

12. The housing assembly according to claim 9, wherein the first mounting surface is provided with a first sliding groove, one end of the first sliding groove faces the first retaining surface, the other end of the first sliding groove does not face the first retaining surface, and a bottom of the first sliding groove is provided with the first shaft hole; and the first sliding groove is configured to guide the first rotating shaft to be inserted into the first shaft hole.

13. The housing assembly according to claim 12, wherein the housing has an outer wall and an inner wall facing away from each other;

the receiving groove is disposed on the outer wall;

the housing assembly further comprises a pressing plate, the pressing plate being provided with a second semi-circular groove, and a center line of the second semi-circular groove overlapping the rotation axis.

14. The housing assembly according to claim 13, wherein the pressing plate is connected to the housing by using a screw.

15. The housing assembly according to claim 4, wherein the groove wall further comprises a connecting surface, the connecting surface being connected between the first and second mounting surfaces;

the first shaft hole is away from the connecting surface, the connecting surface being provided with a third limiting portion; and when the support frame is located at the second position relative to the housing, the support arm abuts on a side of the third limiting portion facing away from the connecting surface.

16. The housing assembly according to claim 15, wherein the third limiting portion comprises a third limiting surface, the third limiting surface facing away from the connecting surface; and when the support frame is located at the second position relative to the housing, the support arm is in close contact with the third limiting surface.

17. The housing assembly according to claim 16, wherein the third limiting portion comprises a second top surface and a second side surface;

the second top surface faces away from a groove bottom of the receiving groove, and the second side surface is adjacent to the second top surface; and a joint between the second top surface and the second side surface is in arc-shaped transition.

18. The housing assembly according to claim 2, wherein: the receiving groove comprises a U-shaped groove.

19. A vehicle diagnostic tablet computer, comprising a housing assembly, wherein the housing assembly comprises:

a housing; and a support frame, mounted to the housing, the support frame being rotatable to a first position or a second position about a rotation axis relative to the housing;

when the support frame rotates to the second position about the rotation axis relative to the housing, the support frame is received in the receiving groove;

the support frame, when unfolded relative to the housing, rotating to the first position about the rotation axis relative to the housing, and the support frame being capable of supporting the housings;

a first mounting surface faces a first retaining surface, a first shaft hole faces the first retaining surface, and a first stopping surface is connected between the first mounting surface and the first retaining surface; and the support frame, when folded relative to the housing, rotating to the second position about the rotation axis relative to the housing;

wherein the groove wall further comprises a first rotating shaft;

wherein the first rotating shaft is inserted into the first shaft hole from a side facing the first mounting surface, wherein the first stopping surface extends on the first mounting surface;

wherein a shortest distance from the first retaining surface to the first mounting surface is less than a length of the first rotating shaft inserted into the first shaft hole.

* * * * *